United States Patent
Nilsson et al.

(10) Patent No.: US 10,810,455 B2
(45) Date of Patent: Oct. 20, 2020

(54) SPATIO-TEMPORAL IMAGE METRIC FOR RENDERED ANIMATIONS

(71) Applicant: NVIDIA Corp., Santa Clara, CA (US)

(72) Inventors: Jim Nilsson, Santa Clara, CA (US); Tomas Akenine-Moller, Santa Clara, CA (US)

(73) Assignee: NVIDIA Corp., Santa Clara, CA (US)

( * ) Notice: Subject to any disclaimer, the term of this patent is extended or adjusted under 35 U.S.C. 154(b) by 108 days.

(21) Appl. No.: 16/291,641

(22) Filed: Mar. 4, 2019

(65) Prior Publication Data

US 2019/0272440 A1 Sep. 5, 2019

Related U.S. Application Data

(60) Provisional application No. 62/638,841, filed on Mar. 5, 2018.

(51) Int. Cl.

| | |
|---|---|
| *G06K 9/46* | (2006.01) |
| *G06K 9/62* | (2006.01) |
| *G06F 17/13* | (2006.01) |
| *G06F 17/17* | (2006.01) |
| *G06T 5/00* | (2006.01) |
| *G06N 3/08* | (2006.01) |
| *G06F 17/14* | (2006.01) |

(52) U.S. Cl.
CPC ........... *G06K 9/4652* (2013.01); *G06F 17/13* (2013.01); *G06F 17/141* (2013.01); *G06F 17/17* (2013.01); *G06K 9/6202* (2013.01); *G06N 3/08* (2013.01); *G06T 5/002* (2013.01)

(58) Field of Classification Search
CPC ........ G06F 17/13; G06F 17/141; G06F 17/17; G06K 9/40; G06K 9/4652; G06K 9/6202; G06N 20/10; G06N 3/08; G06T 5/002; G09G 2320/0242; G09G 2320/0247; G09G 2320/066; G09G 2320/0693; G09G 2340/02; G09G 2360/04; G09G 2360/08; G09G 2360/16; G09G 2370/022; G09G 3/006; G09G 5/02

See application file for complete search history.

(56) References Cited

U.S. PATENT DOCUMENTS

| | | | |
|---|---|---|---|
| 5,694,491 | A | 12/1997 | Brill et al. |
| 5,974,159 | A | 10/1999 | Lubin et al. |
| 6,393,148 | B1 | 5/2002 | Bhaskar |
| 7,672,838 | B1 | 3/2010 | Athineos et al. |

(Continued)

OTHER PUBLICATIONS

You, Junyong, Touradj Ebrahimi, and Andrew Perkis. "Visual attention tuned spatio-velocity contrast sensitivity for video quality assessment." 2011 IEEE International Conference on Multimedia and Expo. IEEE, 2011. (Year: 2011).*

*Primary Examiner* — Nirav G Patel
(74) *Attorney, Agent, or Firm* — Rowan TELS LLC

(57) ABSTRACT

An image processing method transforms image sequences into luminances, filters the luminances, determines the temporal differences between the luminances, performs a frequency domain transformation on the temporal differences, and applies a temporal contrast sensitivity function envelope integral to the frequency transform output to generate a temporal image metric. The temporal image metric may be applied for example to train a neural network or to configure a display device to depict a visual indication of the temporal image metric.

19 Claims, 7 Drawing Sheets

(56) References Cited

U.S. PATENT DOCUMENTS

| | | |
|---|---|---|
| 2001/0041015 A1 | 11/2001 | Chui |
| 2004/0071367 A1 | 4/2004 | Irani et al. |
| 2007/0053489 A1 | 3/2007 | Lu et al. |
| 2009/0090873 A1 | 4/2009 | Sapp et al. |
| 2012/0308155 A1* | 12/2012 | Satoh ................ G09G 3/20 382/274 |
| 2013/0265046 A1 | 10/2013 | Koch |
| 2016/0358615 A1 | 12/2016 | Tsujino et al. |

* cited by examiner

SPATIO-TEMPORAL IMAGE METRIC FOR RENDERED ANIMATIONS

CROSS-REFERENCE TO RELATED APPLICATIONS

This application claims benefit under 35 U.S.C. 119 to U.S. application Ser. No. 62/638,841, entitled "A Spatio-Temporal Image Metric for Rendered Animations", filed on Mar. 5, 2018, and incorporated herein by reference in its entirety.

BACKGROUND

A specialized metric is useful for measuring the perceived visual quality of animations because metrics developed particularly for image and video compression have proved unsuitable for computer graphics applications. Errors in rendered images often are quite different to the noise in natural images or the blockiness in compressed images. The errors in typical computer-generated graphics sequences include various sorts of aliasing, e.g., geometrical, shader, texture, visibility, but also noise and 'fireflies' from, for example, Monte-Carlo based rendering algorithms, or errors arising from different types of reconstruction and filtering algorithms, such as denoising and temporal anti-aliasing.

Many of these errors may be unacceptable for a game developer or for an animated film sequence, for instance. Furthermore, most methods use some type of pooling to condense the errors in an image into a single number. For rendering, this may not always be useful, because even a couple of fireflies in an otherwise perfect image can make the image useless, and most metrics report such an image as extremely similar to the reference image. Also, a static image may appear sufficient in quality, however, during animation small errors can become substantially more visible. Hence, it is important to look at errors over time as well as static errors.

Statistical methods, such as SSIM and 3D-SSIM, are unsuited to this problem. This is a consequence of the fact that these techniques target natural images and video compression. Conventional methods are dependent on the replay frequency, which means that the error image will look the same independent of replay speed.

A contrast sensitivity function (CSF) describes how sensitive humans are to visual stimuli with different frequencies. Thus, a spatial CSF describes sensitivity as a function of the frequency of a spatial change in the image, while a temporal CSF describes sensitivity as a function of the flickering frequency of a visual stimulus. These can also be combined into a spatio-temporal CSF (stCSF), and these dimensions are, in fact, not separable. One conventional method of measuring the quality of computer-generated sequence is a perceptual method to estimate the temporal noise in photon distributions for global illumination rendering. This method does not, however, take other types of artifacts, such as geometrical aliasing, into account. Another conventional method computes an oracle, based on a velocity-dependent sensitivity function that is used to accelerate global illumination rendering. This method also takes into account visual attention. However, it does not exploit information over several frames, which makes it impossible to detect flickering, for example. Yet another conventional method is a full-reference video quality metric for animations generated using computer graphics algorithms. This method compares two image sequences and computes a distortion visibility using a combination of spatio-temporal CSF, three-dimensional Fourier transform, visual masking, and luminance adaption. The method works for HDR and LDR images, and is used for HDR video compression, temporal tone mapping, and for rendered animations using different graphics algorithms. Other conventional techniques using deep features as an image metric are effective, however, they do not extend to the temporal domain.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

"Band-pass filter" refers to a device that passes frequencies within a certain range and rejects frequencies outside that range.

"Control signal" refers to a pulse or frequency of electricity or light that represents a control command as it travels over a network, a computer channel or wireless.

"Photopic conditions" refers to a luminance level 10 to 108 cd/m^2.

"Piecewise linear approximation" refers to a real-valued function defined on the real numbers or a segment thereof, whose graph is composed of straight-line sections.

Disclosed herein is a method and system to analyze rendered animations for quality. An error metric suitable for rendered animations is constructed by predicting human perception of spatial and temporal image fidelity. The method is based upon how the human visual system (HVS) reacts. The method uses color channel (e.g., luminance) filtering, temporal differences, and discrete Fourier transform, weighted against a temporal contrast sensitivity function (TCSF). The resulting temporal metric may be applied as a loss function in a denoising algorithm for deep learning to substantially reduce temporal noise, for example.

The perceived correctness of a test image sequence vs. a reference image sequence depends on the spatial correctness of individual frames. However, the temporal behavior of the rendered sequence can under certain conditions improve on the overall perception of the sequence. Human susceptibility to temporal differences compared to the reference may be understood through the temporal contrast sensitivity function (TCSF).

The TCSF fundamentally describes how temporal flicker is filtered by the human visual system (HVS), up to a point at high frequencies where it is no longer visible. The frequency at which this happens for a particular stimulus, is called the critical flicker frequency (CFF). The disclosed method measures the minimum overall quality based on the worst-case spatial error, with consideration that the frame update frequency can hide these errors in relationship to their position and value under the TCSF envelope. For example, a relatively low per-frame mean-SSIM (MSSIM) metric of 0.8 can be visibly undetectable when the frame rate is high enough, and when the spatial errors are distributed randomly. A typical scenario would be a low sample-count Monte Carlo rendering, with a high update frequency. The integration of the eye is then roughly equivalent to a higher sample-count integration of the same rendering, assuming perfect set-up time in the monitor.

In the examples provided the processing is described on luminance color channels. However the processing may be performed on color channels generally, depending on the implementation.

Figure 1:
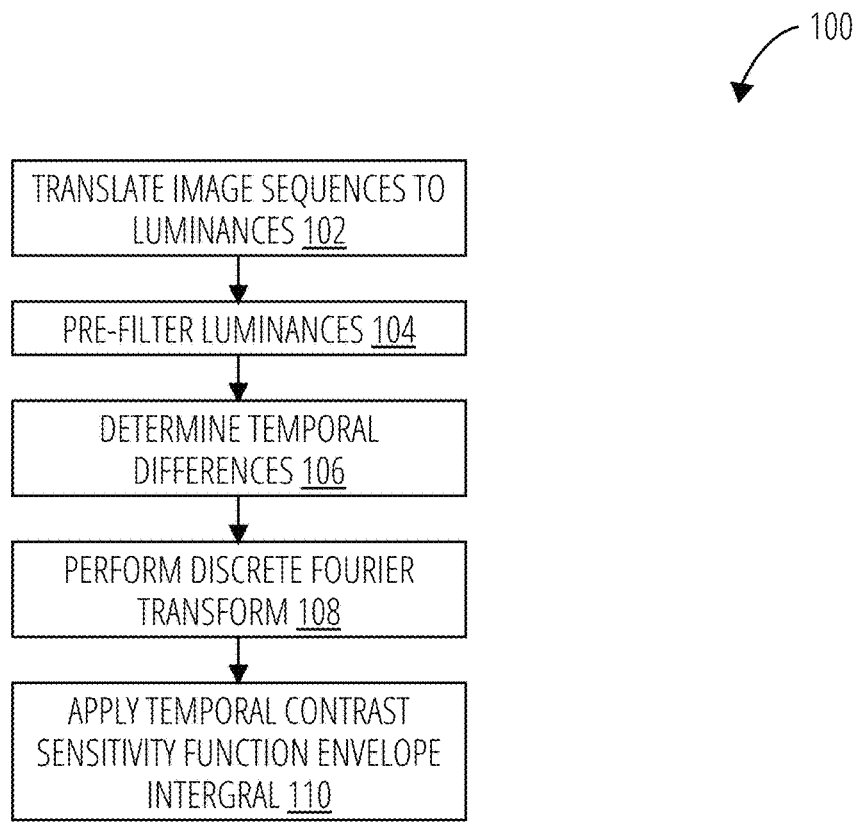
FIG. 1 illustrates an embodiment of a temporal image metric generation method 100.
Figure 6:
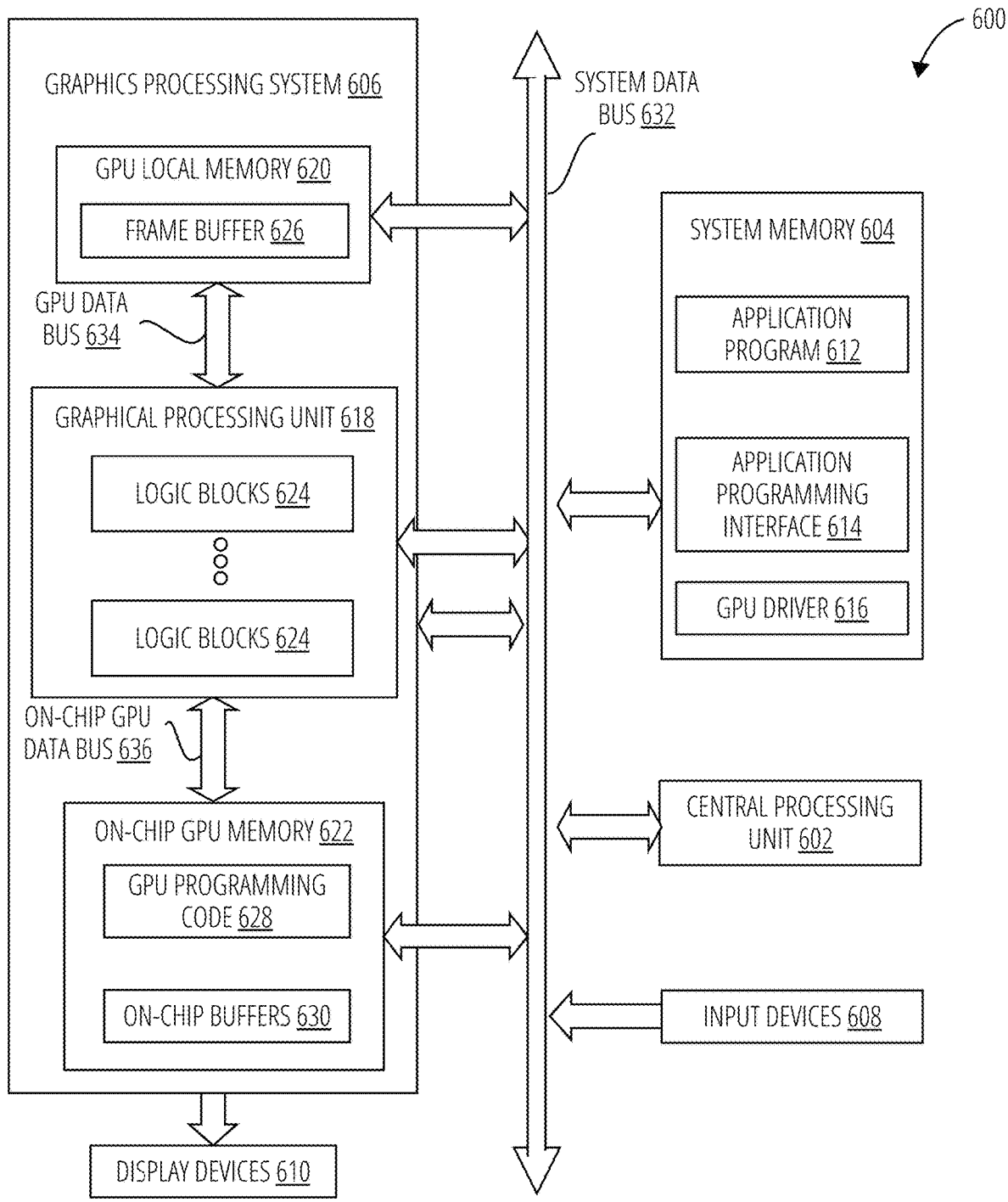
FIG. 6 is a block diagram of a computing system 600 within which the techniques introduced herein may be embodied or carried out.
Figure 7:
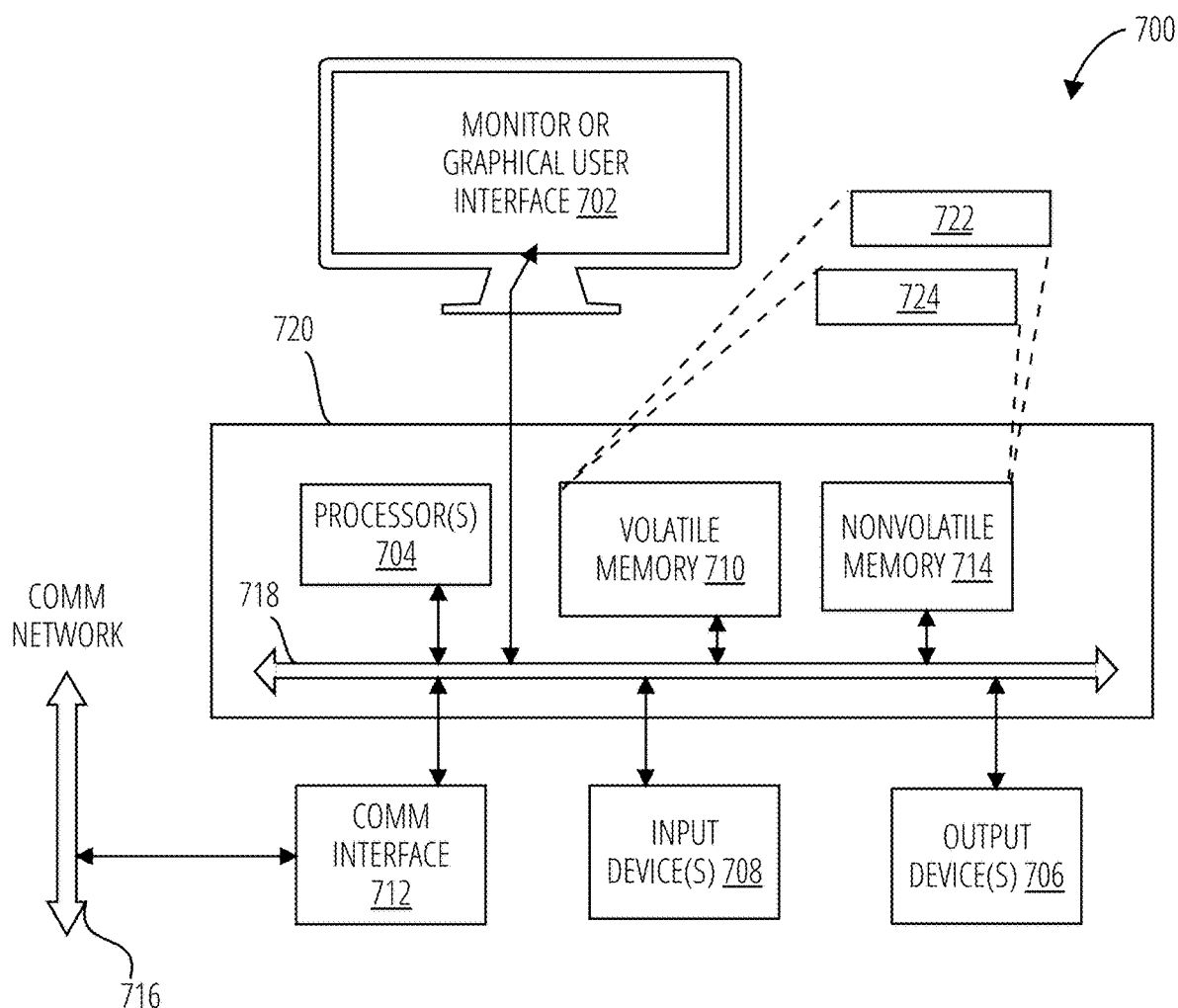
FIG. 7 is an example block diagram of a computing device 700 that may incorporate embodiments of the present invention.

Referring to FIG. 1, a temporal image metric generation method 100 translates image sequences to luminances (block 102). The luminances are pre-filtered (block 104). The temporal differences between the luminances are then determined (block 106). A discrete Fourier transform is performed on the temporal differences (block 108). A temporal contrast sensitivity function envelope integral is applied to generate the temporal image sequence quality metric (block 110) which in turn may be applied to control rendering of the image sequences by a system such as illustrated in FIG. 6 and FIG. 7.

Figure 2:
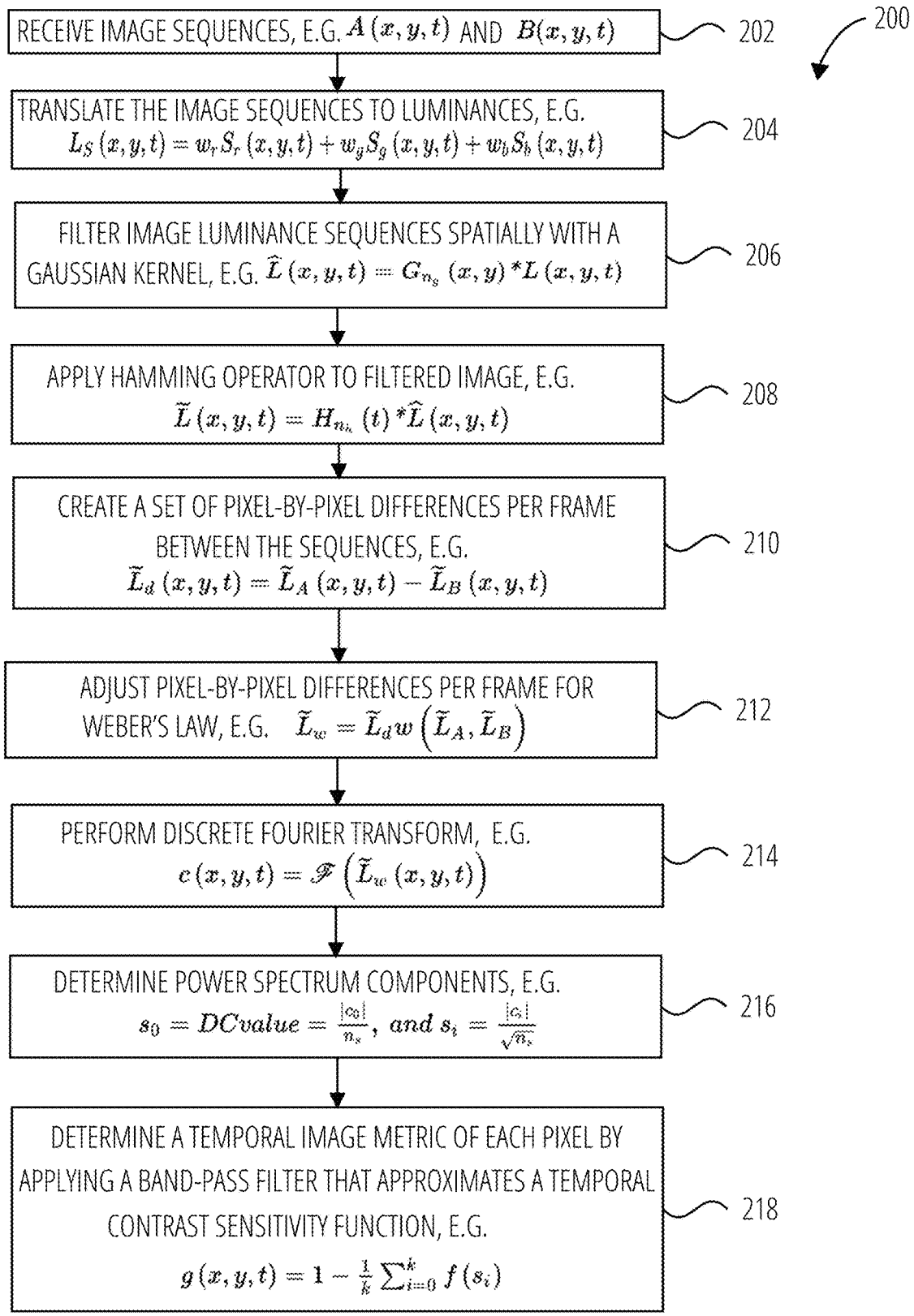
FIG. 2 illustrates an embodiment of a metric generation method 200.

Referring to FIG. 2, a metric generation method 200 receives two input sequences of images, A and B, which may be a reference sequence and test sequence, respectively (block 202). B may be an approximation of A, such as a rendering with lower quality. As A and B are image sequences, a particular corresponding pixel pair is accessed both spatially and temporally as A(x,y,t) and B(x,y,t). A particular color channel is accessed with subscripts r, g, and b, for example, $A_r(x,y,t)$ for the red channel of image sequence A. The color values in an image sequence, S, are transformed to luminance, $L_S$, (block 204) per Equation 1:

$$L_S(x,y,t)=w_r S_r(x,y,t)+w_g S_g(x,y,t)+w_b S_b(x,y,t) \quad \text{Equation 1}$$

where $w_r$, $w_g$, and $w_b$ are weight coefficients, such as 0.212655, 0.715157, and 0.072187, respectively. Here, S may be A or B. In other embodiments, such as for high dynamic range (HDR) images, tone mapping may be performed prior to this process. In some embodiments, the metric generation method 200 determines that the image sequences comprise HDR images and, in response, performs tone mapping.

The image luminance sequences are in some embodiments filtered spatially with a Gaussian kernel, $G_n(x,y)$, (block 206) per Equation 2:

$$\hat{L}(x,y,t)=G_{n_g}(x,y)*L(x,y,t) \quad \text{Equation 2}$$

The Gaussian kernel may be of a size $n_g \times n_g$. Filter sigmas may be set to half the radius. For example, for a filter of size 7×7, the radius is 3, and, thus, σ=1.5. This operation is performed for both image sequences A and B. Here, the "*" is the convolution operator. Other types of filtering besides those utilizing Gaussian kernels may also be employed.

An optional Hamming window may be applied to investigate reduction of the temporal sensitivity of frequency components outside the current frame, that is, to mimic the limited retinal persistence of humans (block 208) per Equation 3:

$$\tilde{L}(x,y,t)=H_{n_b}(t)*\hat{L}(x,y,t) \quad \text{Equation 3}$$

where the Hamming function is given by Equation 4:

$$H_{n_b}(t) = \alpha - \beta \cos\left(\frac{2\pi t}{n_b - 1}\right) \quad \text{Equation 4}$$

and where the standard values are α=0.54, β=1−α=0.46, and $n_b$ being the number of samples in the temporal dimension. This may result in damping recurrent errors in time, for example, a missing and moving specular highlight that otherwise would produce regular copies in the direction of movement.

A set of pixel-by-pixel differences per frame between sequence A and B are created (block 210) per Equation 5:

$$\tilde{L}_d(x,y,t)=\tilde{L}_A(x,y,t)-\tilde{L}_B(x,y,t) \quad \text{Equation 5}$$

The set of pixel-by-pixel differences per frame is adjusted to account for the effects of Weber's law (block 212) per Equation 6:

$$\tilde{L}_w=\tilde{L}_d w(\tilde{L}_A,\tilde{L}_B) \quad \text{Equation 6}$$

The function w emphasizes changes at low base luminances. While Weber's law states the linear relationship between detectable difference and base luminosity, specifically that ΔS/S=constant, with S being the initial stimulus and ΔS being the just noticeable difference (JND), the particular function, w, is specific to a particular environment. Inputs may be received to determine a piecewise linear approximation of w. For example, in one embodiment, w is a linear interpolation utilizing the following points: {0.0, 0.2}, {0.03, 1.0}, and {1.0, 0.1}, where the first coordinate of each pair is the luminance level (∈[0, 1]), and the second coordinate is the suppression level, w, at that luminance level.

The difference and adjustment to the difference to compute L˜w (Equations 5 and 6) may be performed in other ways, depending on the implementation. For example:

Method 1:

A˜=G*A (* is the convolution operator here)

B˜=G*B

D=A˜−B˜

L˜w=Dw(min (A˜,B˜)), where the function w is the suppression factor described above.

Method 2:

D=A−B

W=|A−B|(A−B)

L=DW(A,B) where per-channel component multiplication is performed between D and W.

Method 3:

D=A−B

E=G*D (* is convolution)

L˜w=(1−α)D+αE where α is a tuning constant)

A frequency domain conversion of the time samples, for example a discrete Fourier transform (DFT) of $n_s$ samples in time is then performed (block 214) per Equation 7:

$$c(x,y,t)=\mathscr{F}(\tilde{L}_w(x,y,t)) \quad \text{Equation 7}$$

where c is a vector of $n_s$ complex numbers $\{c_j\}$, j∈{0, . . . , $n_s$−1}. Next, the power spectrum components, si, are determined (block 216) per Equations 8 and 9:

$$s_0 = DCvalue = \frac{|c_0|}{n_s} \quad \text{Equation 8}$$

$$s_i = \frac{|c_i|}{\sqrt{n_s}} \quad \text{Equation 9}$$

where $i \in \{1, \ldots, k\}$ and $k = |n_s/2|$. These power spectrum components form a vector per pixel, $s(x,y,t) = \{s_0(x,y,t), \ldots, s_k(x,y,t)\}$. In this embodiment, the power spectrum frequency components are normalized by $1/\sqrt{n_s}$ to make the transform unitary.

A temporal image metric (TIM) is determined by applying a band-pass filter that is a piecewise linear approximation of a temporal contrast sensitivity function (TCSF) at photopic conditions before summing the filtered signal components and normalizing by the number of samples (block 218) per Equation 10:

$$g(x, y, t) = 1 - \frac{1}{k}\sum_{i=0}^{k} f(s_i) \quad \text{Equation 10}$$

where the function f, in one embodiment, is described by a linear interpolation between the points: {0.0, 0.05}, {2.6, 0.8}, {27.0, 0.9}, and {70.0, 0.0}. The first coordinate is the frequency and the second is the contrast sensitivity. In this embodiment, the DC component (so) of the frequency spectrum is included, thus accounting for static pixel differences. The sum, after normalization by the number of samples, constitutes a badness, b(x,y,t) of a pixel, which is a value indicating the amount of noticeable disturbance in this pixel compared to the reference. In some embodiments, g(x,y,t) is computed for each pixel in all images, which is the TIM. These values may be pooled in different ways and applied to affect the operation of one or more computer graphics rendering machines to improve the TIM in a feedback cycle.

More generally, the temporal bandpass filter is any custom filter that approximates a TCSF.

Figure 3:
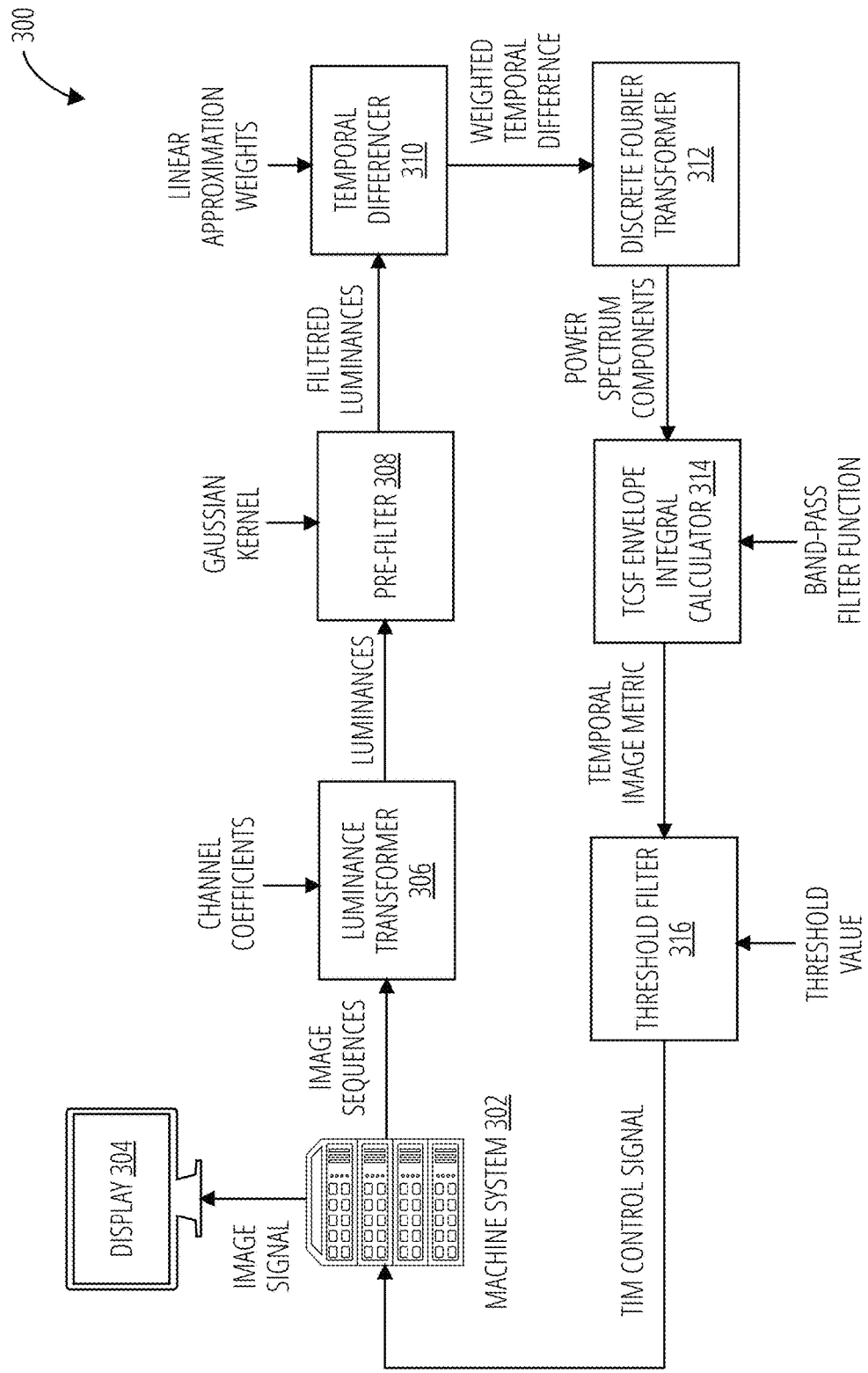
FIG. 3 illustrates an embodiment of an image rendering system 300.

Referring to FIG. 3, an image rendering system 300 comprises a machine system 302, a display 304, a luminance transformer 306, a pre-filter 308, a temporal differencer 310, a discrete Fourier transformer 312, a temporal contrast sensitivity function envelope integral calculator 314, and a threshold filter 316.

The machine system 302 receives a temporal image metric (TIM) control signal from the threshold filter 316 and sends an image signal to the display 304 and image sequences to the luminance transformer 306. The machine system 302 may operate using components depicted in FIG. 6 and FIG. 7. The machine system 302 may utilize the TIM control signal to alter an image generation process, the altered process generating further image sequences. The TIM control signal may be pooled into a single metric from the per-pixel values. The TIM control signal may also be a set of number, such as minimum, maximum, average, and variance, which may be collected in a histogram. The histogram may overlay an image. The TIM control may also operate the machine system 302 to utilize the TIM as a loss function in a neural network. In other words, the TIM control signal may be applied as a feedback signal to train the neural network. For example, the TIM may be utilized in place of the $l_2$ loss function. Resulting images may be sent to be displayed on the display 304 and/or sent as images sequences to the luminance transformer 306. The display 304 receives an image signal from the machine system 302 and displays the image.

The luminance transformer 306 receives image sequences from the machine system 302 and channel coefficients. Each of the image sequences may have one or more channels, such as the red, green, and blue color channels. A channel coefficient may be received for each channel. The luminance transformer 306 utilizes the channel coefficients to transform the image sequences into luminances, which are sent to the pre-filter 308. In some embodiments, the luminance transformer 306 may also receive images sequences from a source other than the machine system 302. For example, the luminance transformer 306 may receive a reference image sequence from an archive or network source, to compare to the image sequence (test) received from the machine system 302.

The pre-filter 308 receives the luminances from the luminance transformer 306 and the Gaussian kernel. The Gaussian kernel may be of a set size, radius, and filter sigma. The pre-filter 308 transforms the luminances to filtered luminances, which are sent to the temporal differencer 310. In some embodiment, the pre-filter 308 applies a Hamming window to perform temporal filtering.

The temporal differencer 310 receives the filtered luminances from the pre-filter 308 and linear approximation weights. The temporal differencer 310 determines the difference between the filtered luminances for each of the image sequences. For embodiments wherein more than two image sequences are received, the temporal differencer 310 may determine whether to determine each difference or to select one sequence as a reference sequence and compare each of the other test sequences to that reference sequence. The temporal differencer 310 may then utilize the linear approximation weights to weight the temporal difference. The weighted temporal difference is then sent to the discrete Fourier transformer 312. The discrete Fourier transformer 312 receives the weighted temporal difference, applies a Fourier transform to generate power spectrum components, and sends those power spectrum components to the temporal contrast sensitivity function envelope integral calculator 314.

The temporal contrast sensitivity function envelope integral calculator 314 receives the power spectrum components and a band-pass filter function. The temporal contrast sensitivity function envelope integral calculator 314 then calculates a temporal image metric (TIM). The TIM is applied to affect the operation of the threshold filter 316. The TIM may be a measure of the "badness" or "goodness" of a pixel, where the "badness" is a value indicating the amount of noticeable disturbance in this pixel compared to the reference and the "goodness" is a function of the "badness", for example "badness"=1–"goodness".

The threshold filter 316 receives the TIM from the temporal contrast sensitivity function envelope integral calculator 314 and a threshold value. The threshold received and utilized by the threshold filter 316 may differ based on whether the TIM is measuring "badness" or "goodness". If the "badness" is above a threshold, or the "goodness" below the threshold, the threshold filter 316 generates the TIM control signal, which is sent to the machine system 302. The image rendering system 300 may be operated in accordance with FIG. 1 and FIG. 2.

Figure 4:
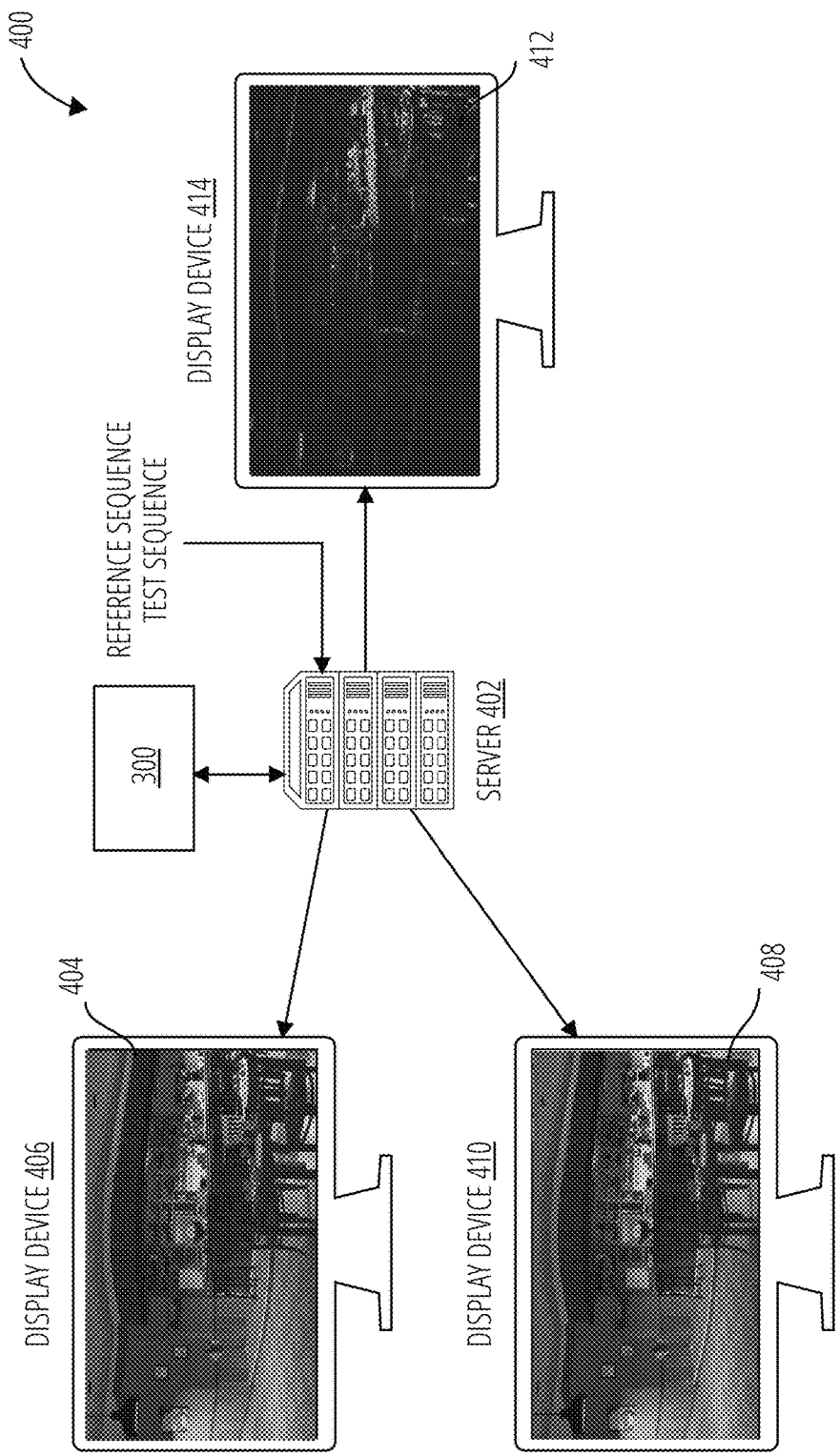
FIG. 4 illustrates an embodiment of an image display system 400.

Referring to FIG. 4, an image display system 400 comprises an image rendering system 300, a server 402, a reference video 404, a display device 406, a test video 408, a display device 410, a TIM visual indication 412, and a display device 414.

The server 402 receives the reference sequence and the test sequence. The server 402 may configure the display device 406 to display the reference sequence as the reference video 404. The server 402 may also configure the display device 410 to display the test sequence as the test video 408. The server 402 sends the reference sequence and the test sequence to the image rendering system 300 to generate a temporal image metric. The server 402 then receives a control signal to configure the display device 414 to display a visual indication of the temporal image metric, the TIM visual indication 412. The TIM visual indication 412 may utilize a histogram depicting various values associated with the TIM, such as minimum, maximum, average, and variance. The TIM visual indication 412 may also be a color map (as depicted in FIG. 4) that transforms the values into an associated color. For example, the TIM visual indication 412 may utilize blue (or another "cool" color) to depict an area of the sequence (or image of the sequence) that has a lower value, such as average TIM, and may utilize red (or another "warm" color) to depict an area of the sequence (or image of the sequence) that has a higher value, such as average TIM. In some embodiment, the display device 406, the display device 410, and the display device 414 are the same display device, which is re-configured by the server 402 to display the reference video 404, the test video 408, and the TIM visual indication 412.

Figure 5:
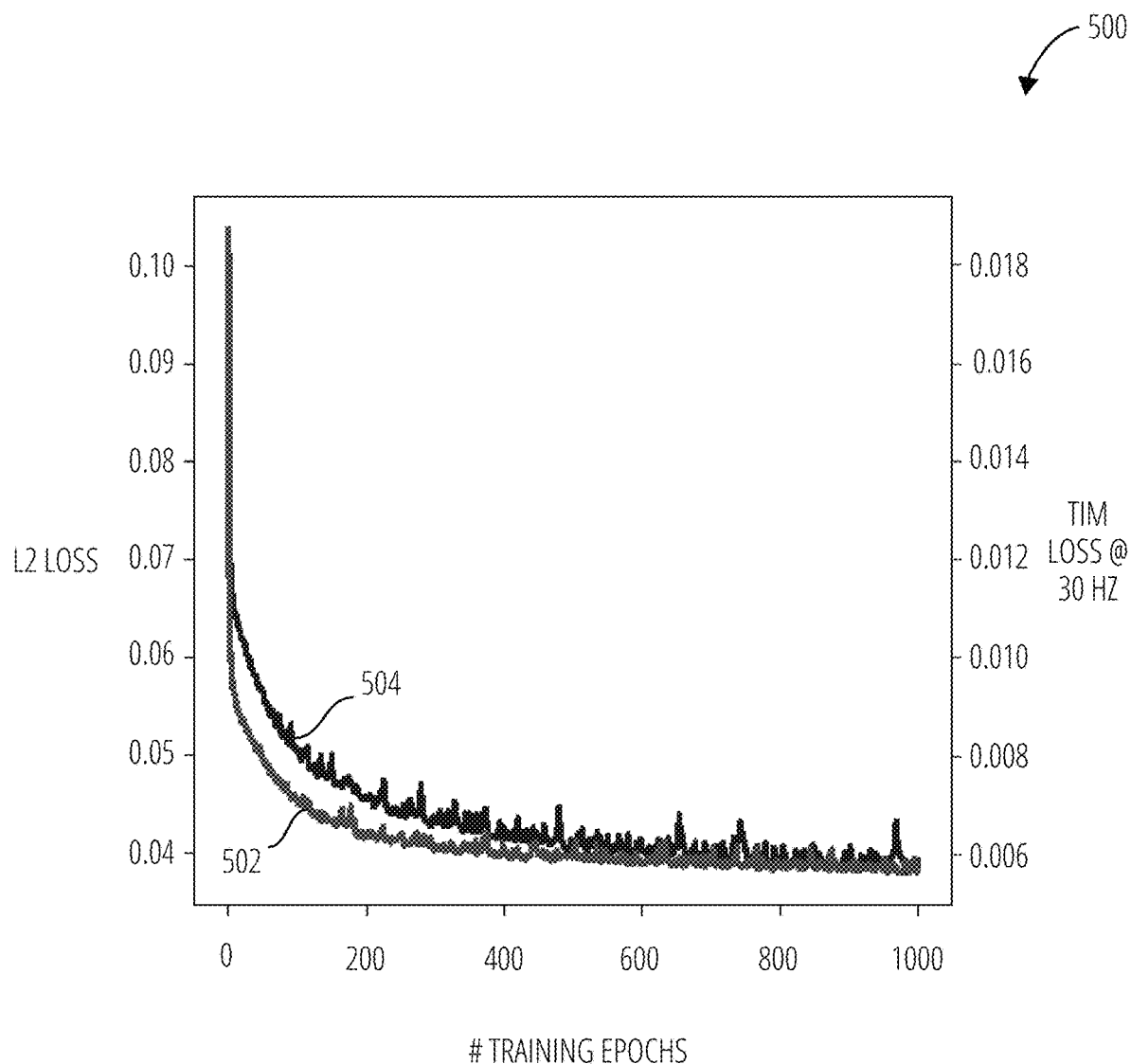
FIG. 5 illustrates an embodiment of a neural network training diagram 500.

Referring to FIG. 5, a neural network training diagram 500 comprises a TIM loss 502 and an L2 loss 504 over a number of training epochs. The temporal image metric generated by an image rendering system, such as the image rendering system 300, may be utilized as a loss function to train a neural network in place of a conventional loss function, such as a 2 norm. Training may continue for a pre-determined number of epochs, until the loss is below a threshold value, until the average loss is below a threshold value, until the average loss over a specific window (such as the last N number of epochs) is below a threshold value, etc. As depicted in FIG. 5, utilizing the TIM loss 502 in place of the L2 loss 504 may result in fewer computations performed to train a neural network, and, thus, a more efficient system.

FIG. 6 is a block diagram of one embodiment of a computing system 600 in which one or more aspects of the disclosure may be implemented. The computing system 600 includes a system data bus 632, a CPU 602, input devices 608, a system memory 604, a graphics processing system 606, and display devices 610. In alternate embodiments, the CPU 602, portions of the graphics processing system 606, the system data bus 632, or any combination thereof, may be integrated into a single processing unit. Further, the functionality of the graphics processing system 606 may be included in a chipset or in some other type of special purpose processing unit or co-processor.

As shown, the system data bus 632 connects the CPU 602, the input devices 608, the system memory 604, and the graphics processing system 606. In alternate embodiments, the system memory 604 may connect directly to the CPU 602. The CPU 602 receives user input from the input devices 608, executes programming instructions stored in the system memory 604, operates on data stored in the system memory 604 to perform computational tasks. The system memory 604 typically includes dynamic random access memory (DRAM) employed to store programming instructions and data. The graphics processing system 606 receives instructions transmitted by the CPU 602 and processes the instructions, for example to implement aspects of the disclosed embodiments, and/or to render and display graphics (e.g., images, tiles, video) on the display devices 610.

As also shown, the system memory 604 includes an application program 612, an API 614 (application programming interface), and a graphics processing unit driver 616 (GPU driver). The application program 612 generates calls to the API 614 to produce a desired set of computational results. For example, the application program 612 may transmit programs or functions thereof to the API 614 for processing within the graphics processing unit driver 616.

The graphics processing system 606 includes a GPU 618 (graphics processing unit), an on-chip GPU memory 622, an on-chip GPU data bus 636, a GPU local memory 620, and a GPU data bus 634. The GPU 618 is configured to communicate with the on-chip GPU memory 622 via the on-chip GPU data bus 636 and with the GPU local memory 620 via the GPU data bus 634. The GPU 618 may receive instructions transmitted by the CPU 602, process the instructions, and store results in the GPU local memory 620. Subsequently, the GPU 618 may display certain graphics stored in the GPU local memory 620 on the display devices 610.

The GPU 618 includes one or more logic blocks 624. The logic blocks 624 may implement embodiments of the systems and techniques disclosed herein.

The disclosed embodiments may be utilized to communicate data between various components of the computing system 600. Exemplary component communications include between the CPU 602 and/or the GPU 618 and the memory circuits, including the system memory 604, the GPU local memory 620, and/or the on-chip GPU memory 622.

The GPU 618 may be provided with any amount of on-chip GPU memory 622 and GPU local memory 620, including none, and may employ on-chip GPU memory 622, GPU local memory 620, and system memory 604 in any combination for memory operations.

The on-chip GPU memory 622 is configured to include GPU programming 628 and on-Chip Buffers 630. The GPU programming 628 may be transmitted from the graphics processing unit driver 616 to the on-chip GPU memory 622 via the system data bus 632. The GPU programming 628 may include the logic blocks 624.

The GPU local memory 620 typically includes less expensive off-chip dynamic random access memory (DRAM) and is also employed to store data and programming employed by the GPU 618. As shown, the GPU local memory 620 includes a frame buffer 626. The frame buffer 626 may for example store data for example an image, e.g., a graphics surface, that may be employed to drive the display devices 610. The frame buffer 626 may include more than one surface so that the GPU 618 can render one surface while a second surface is employed to drive the display devices 610.

The display devices 610 are one or more output devices capable of emitting a visual image corresponding to an input data signal. For example, a display device may be built using a liquid crystal display, or any other suitable display system. The input data signals to the display devices 610 are typically generated by scanning out the contents of one or more frames of image data that is stored in the frame buffer 626.

FIG. 7 is an example block diagram of a computing device 700 that may incorporate embodiments of the present invention. FIG. 7 is merely illustrative of a machine system to carry out aspects of the technical processes described herein, and does not limit the scope of the claims. One of ordinary skill in the art would recognize other variations, modifications, and alternatives. In one embodiment, the computing device 700 typically includes a monitor or graphical user interface 702, a data processing system 720, a communication network interface 712, input device(s) 708, output device(s) 706, and the like.

As depicted in FIG. 7, the data processing system 720 may include one or more processor(s) 704 that communicate with a number of peripheral devices via a bus subsystem 718. These peripheral devices may include input device(s) 708, output device(s) 706, communication network interface 712, and a storage subsystem, such as a volatile memory 710 and a nonvolatile memory 714.

The volatile memory 710 and/or the nonvolatile memory 714 may store computer-executable instructions and thus forming logic 722 and band-pass filter 724 that when applied to and executed by the processor(s) 704 implement embodiments of the processes disclosed herein, for example in FIG. 1 and FIG. 2.

The input device(s) 708 include devices and mechanisms for inputting information to the data processing system 720. These may include a keyboard, a keypad, a touch screen incorporated into the monitor or graphical user interface 702, audio input devices such as voice recognition systems, microphones, and other types of input devices. In various embodiments, the input device(s) 708 may be embodied as a computer mouse, a trackball, a track pad, a joystick, wireless remote, drawing tablet, voice command system, eye tracking system, and the like. The input device(s) 708 typically allow a user to select objects, icons, control areas, text and the like that appear on the monitor or graphical user interface 702 via a command such as a click of a button or the like.

The output device(s) 706 include devices and mechanisms for outputting information from the data processing system 720. These may include the monitor or graphical user interface 702, speakers, printers, infrared LEDs, and so on as well understood in the art.

The communication network interface 712 provides an interface to communication networks (e.g., communication network 716) and devices external to the data processing system 720. The communication network interface 712 may serve as an interface for receiving data from and transmitting data to other systems. Embodiments of the communication network interface 712 may include an Ethernet interface, a modem (telephone, satellite, cable, ISDN), (asynchronous) digital subscriber line (DSL), FireWire, USB, a wireless communication interface such as Bluetooth or WiFi, a near field communication wireless interface, a cellular interface, and the like.

The communication network interface 712 may be coupled to the communication network 716 via an antenna, a cable, or the like. In some embodiments, the communication network interface 712 may be physically integrated on a circuit board of the data processing system 720, or in some cases may be implemented in software or firmware, such as "soft modems", or the like.

The computing device 700 may include logic that enables communications over a network using protocols such as HTTP, TCP/IP, RTP/RTSP, IPX, UDP and the like.

The volatile memory 710 and the nonvolatile memory 714 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 710 and the nonvolatile memory 714 may be configured to store the basic programming and data constructs that provide the functionality of the disclosed processes and other embodiments thereof that fall within the scope of the present invention.

Logic 722 that implements embodiments of the present invention may be stored in the volatile memory 710 and/or the nonvolatile memory 714. Said logic 722 may be read from the volatile memory 710 and/or nonvolatile memory 714 and executed by the processor(s) 704. The volatile memory 710 and the nonvolatile memory 714 may also provide a repository for storing data used by the logic 722.

The volatile memory 710 and the nonvolatile memory 714 may include a number of memories including a main random access memory (RAM) for storage of instructions and data during program execution and a read only memory (ROM) in which read-only non-transitory instructions are stored. The volatile memory 710 and the nonvolatile memory 714 may include a file storage subsystem providing persistent (non-volatile) storage for program and data files. The volatile memory 710 and the nonvolatile memory 714 may include removable storage systems, such as removable flash memory.

The bus subsystem 718 provides a mechanism for enabling the various components and subsystems of data processing system 720 communicate with each other as intended. Although the communication network interface 712 is depicted schematically as a single bus, some embodiments of the bus subsystem 718 may utilize multiple distinct busses.

It will be readily apparent to one of ordinary skill in the art that the computing device 700 may be a device such as a smartphone, a desktop computer, a laptop computer, a rack-mounted computer system, a computer server, or a tablet computer device. As commonly known in the art, the computing device 700 may be implemented as a collection of multiple networked computing devices. Further, the computing device 700 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Terms used herein should be accorded their ordinary meaning in the relevant arts, or the meaning indicated by their use in context, but if an express definition is provided, that meaning controls.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

A "band-pass filter" refers to a device that passes frequencies within a certain range and rejects frequencies outside that range.

"Control signal" refers to a pulse or frequency of electricity or light that represents a control command as it travels over a network, a computer channel or wireless.

"Photopic conditions" refers to a luminance level 10 to 108 cd/m^2.

"Piecewise linear approximation" refers to a real-valued function defined on the real numbers or a segment thereof, whose graph is composed of straight-line sections.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. An image processing method, comprising:
    transforming image sequences into luminances;
    filtering the luminances;
    determining temporal differences between the luminances;
    performing a frequency domain transformation on the temporal differences;
    applying a temporal contrast sensitivity function envelope integral to the frequency domain transformation to generate a temporal image metric;
    applying the temporal image metric to control an image rendering system; and
    utilizing the temporal image metric to generate a first control signal to configure a display device to display a visual indication of the temporal image metric.

2. The image processing method of claim 1, wherein transforming the image sequences into the luminances comprises calculating a per-pixel weighted sum of color values at each point in time for the image sequences.

3. The image processing method of claim 1, wherein the image sequences comprise a reference sequence and a test sequence, the reference sequence and the test sequence transformed into a reference luminance and a test luminance, and filtering the luminances comprises filtering the reference luminance and the test luminance spatially with a Gaussian kernel.

4. The image processing method of claim 1, wherein the image sequences comprise a reference sequence and a test sequence, the reference sequence and the test sequence transformed into a reference luminance and a test luminance, and filtering the luminances comprises filtering the reference luminance and the test luminance temporally with a Hamming window.

5. The image processing method of claim 1, wherein determining the temporal differences between the luminances comprises creating a set of pixel-by-pixel differences per frame between the luminances, the luminances comprising a reference luminance and a test luminance.

6. The image processing method of claim 1, wherein the temporal differences are adjusted on a pixel by pixel basis to account for perceptual effects of luminosity.

7. The image processing method of claim 6, wherein the pixel by pixel basis to account for perceptual effects of luminosity comprises applying a piecewise linear approximation determined by a set of coordinates correlating a luminance level and a suppression level.

8. The image processing method of claim 1, wherein applying the temporal contrast sensitivity function envelope integral to the frequency domain transformation comprises:
applying a band-pass filter that is a piecewise linear approximation of a temporal contrast sensitivity function at photopic conditions to generate filtered signal components; and
summing the filtered signal components.

9. The image processing method of claim 1, wherein the temporal image metric is utilized to generate a second control signal to train a neural network to reduce temporal artifacts for denoising of images.

10. A computing apparatus, the computing apparatus comprising:
a processor; and
a memory storing instructions that, when executed by the processor, configure the apparatus to:
transform image sequences into luminances;
filter the luminances;
determine temporal differences between the luminances;
perform a frequency domain transformation on the temporal differences;
apply a temporal contrast sensitivity function envelope integral to the frequency domain transformation to generate a temporal image metric;
apply the temporal image metric to control rendering of the image sequences; and
use the temporal image metric to generate a first control signal to train a neural network to reduce temporal artifacts for denoising of images.

11. The computing apparatus of claim 10, wherein transforming the image sequences into the luminances comprises calculate a per-pixel weighted sum of color values at each point in time for the image sequences.

12. The computing apparatus of claim 10, wherein the image sequences comprise a reference sequence and a test sequence, the reference sequence and the test sequence transformed into a reference luminance and a test luminance, and filter the luminances comprises filtering the reference luminance and the test luminance spatially with a Gaussian kernel.

13. The computing apparatus of claim 10, wherein the image sequences comprise a reference sequence and a test sequence, the reference sequence and the test sequence transformed into a reference luminance and a test luminance, and filter the luminances comprises filtering the reference luminance and the test luminance temporally with a Hamming window.

14. The computing apparatus of claim 10, wherein determining the temporal differences between the luminances comprises create a set of pixel-by-pixel differences per frame between the luminances, the luminances comprising a reference luminance and a test luminance.

15. The computing apparatus of claim 10, wherein the temporal differences are adjusted on a pixel by pixel basis to account for perceptual effects of luminosity.

16. The computing apparatus of claim 15, wherein the pixel by pixel basis to account for perceptual effects of luminosity comprises applying a piecewise linear approximation determined by a set of coordinates correlating a luminance level and a suppression level.

17. The computing apparatus of claim 10, wherein applying the temporal contrast sensitivity function envelope integral to the frequency domain transformation comprises:
apply a band-pass filter that is a piecewise linear approximation of a temporal contrast sensitivity function at photopic conditions to generate filtered signal components; and
sum the filtered signal components.

18. The computing apparatus of claim 10, wherein the temporal image metric is utilized to generate a second control signal to configure a display device to display a visual indication of the temporal image metric.

19. A computing apparatus, the computing apparatus comprising:
a processor; and
a memory storing instructions that, when executed by the processor, configure the apparatus to:
transform image sequences into luminances;
filter the luminances;
determine temporal differences between the luminances;
adjust the temporal differences on a pixel by pixel basis to account for perceptual effects of luminosity;
perform a frequency domain transformation on the temporal differences;
apply a temporal contrast sensitivity function envelope integral to the frequency domain transformation to generate a temporal image metric; and
apply the temporal image metric to control rendering of the image sequences.

* * * * *